United States Patent [19]

Weaver et al.

[11] Patent Number: 4,936,385

[45] Date of Patent: Jun. 26, 1990

[54] METHOD OF PARTICULATE CONSOLIDATION

[75] Inventors: Jimmie D. Weaver; Joseph R. Murphey, both of Duncan, Okla.

[73] Assignee: Halliburton Company, Duncan, Okla.

[21] Appl. No.: 429,749

[22] Filed: Oct. 30, 1989

[51] Int. Cl.⁵ .................... E21B 33/138; E21B 36/00
[52] U.S. Cl. .................... 166/288; 166/295; 166/297; 166/299; 166/300
[58] Field of Search .............. 166/288, 299, 297, 295, 166/300, 63

[56] References Cited

U.S. PATENT DOCUMENTS

| | | | |
|---|---|---|---|
| 2,770,306 | 11/1956 | Clark, Jr. | 166/295 |
| 3,115,932 | 12/1963 | Reynolds | 166/63 X |
| 3,141,513 | 3/1964 | Davis | 166/295 |
| 3,393,739 | 7/1968 | Rosenberg | 166/300 X |
| 3,409,079 | 11/1968 | Burtch | 166/288 |
| 3,422,760 | 1/1969 | Mohaupt | 166/63 X |
| 3,437,143 | 4/1969 | Cook | 166/297 X |
| 3,536,137 | 10/1970 | Walther | 166/295 |
| 3,625,287 | 12/1971 | Young | 166/295 |
| 3,759,327 | 9/1973 | Carnes | 166/295 |
| 3,820,604 | 6/1974 | Karnes | 166/297 |
| 4,009,757 | 3/1977 | Vann | 266/297 X |
| 4,042,032 | 8/1977 | Anderson et al. | 166/276 |
| 4,105,251 | 8/1978 | Wolff | 299/2 |
| 4,427,069 | 1/1984 | Friedman | 166/295 |
| 4,548,252 | 10/1985 | Stowe | 166/299 |
| 4,590,997 | 5/1986 | Stowe | 166/250 |
| 4,617,997 | 10/1986 | Jennings, Jr. | 166/299 |
| 4,662,451 | 5/1987 | Boade | 166/299 |
| 4,669,543 | 6/1987 | Young | 166/276 |
| 4,714,114 | 12/1987 | Jones | 166/280 |
| 4,739,832 | 4/1988 | Jennings, Jr. et al. | 166/299 |
| 4,787,456 | 11/1988 | Jennings, Jr. et al. | 166/281 |
| 4,807,702 | 2/1989 | Jennings, Jr. et al. | 166/299 |
| 4,842,072 | 6/1989 | Friedman | 166/300 X |

*Primary Examiner*—George A. Suchfield
*Attorney, Agent, or Firm*—Robert A. Kent

[57] ABSTRACT

The present invention provides a method of consolidating an incompetent subterrnean formation. An acid curable resin consolidating fluid is positioned within casing in a wellbore in the vicinity of perforations through the casing. A gas generating charge positioned within the casing then is ignited to generate gas pressure which rapidly forces the consolidating fluid through the perforations and into the subterranean formation while substantially simultaneously catalyzing the resin composition. The consolidating fluid is caused to rapidly harden to consolidate the formation in the vicinity of the perforation without any significant permeability loss.

11 Claims, No Drawings

METHOD OF PARTICULATE CONSOLIDATION

BACKGROUND OF THE INVENTION

1. Field of the Invention

This invention relates to methods of consolidating solids in the vicinity of a wellbore and more particularly relates to the consolidation of incompetent formations utilizing resinous compositions and a rapid acting catalyst.

2. Description of the Prior Art

Sand consolidation is a near wellbore treatment of a well to be tested or placed in production. Surrounding a wellbore in many instances are incompetent highly porous and fragmentable sand or particulate formations. Under production conditions, the particulate is often displaced from its aggregated structure and carried along by a fluid flowing to a producing well. If the particulate flow is allowed to proceed unchecked the producing wellbore soon becomes full of sand, thereby clogging oil production. Furthermore, particulate arriving at the surface of the well wears out the production hardware.

If has therefore been the subject of extensive research by the petroleum industry to develop techniques to minimize or obviate displacement of sand particles into producing well areas. One such general approach suggested in the art is to consolidate the porous particulate structures. Sand consolidation techniques are aimed at cementing loose sand structure adjacent a wellbore. Such consolidation is necessary to prevent breakdown of sand formations and subsequent clogging of producing wells.

The major feature of sand consolidation is to make a sieve next to the producing wellbore such that hydrocarbons can reach the wellbore while sand flow is retarded. The sieve is composed of formation particulate already present surrounding the wellbore area which is cemented together by consolidating material added to the formation. The consolidation need only be thick enough to prevent particulate breakdown adjacent to the wellbore. Ordinarily consolidation is effected for only a few inches around the periphery of the wellbore.

Accordingly, criteria for good consolidations are considered to be as follows. First, the consolidation structure should hold back formation particles while preserving high permeability. As consolidating material is added to the formation, this material will necessarily occupy part of the pore space causing permeability reduction. Therefore, an object of practical formation consolidation is to minimize occlusion of pore spaces so that hydrocarbons can flow to the producing wellbore.

Second, durability is a desired feature of a consolidation. The thin film of consolidating material holding the particulate should be physically durable in resisting deterioration by oil, water and other fluids in the formation.

Third, the consolidation action should not set up in the wellbore prematurely thereby occluding the wellbore path for hydrocarbon production.

Further, the consolidation operation should be simple, efficient and inexpensive. The economic significance of such an operation is great and the problems described above have been well recognized by the petroleum industry for many years. Many efforts have been made to satisfy these problems in whole or in part.

One particular approach to formation consolidation has been to inject into a well a polymerizable resin which polymerizes within the well formation. The polymer material forms a viscous mass which readily adheres to the porous particulate structures. As the particulate surfaces become coated, they no longer are subject to displacement when exposed to fluid flow. Unfortunately, the polymerization reaction is difficult to control so as to only consolidate the particulate without plugging the pore spaces and ultimately blocking permeability through the porous strata.

One of the better consolidating agents for high temperature wells is a polymerized furfuryl alcohol resin. The material resists heat as well as oil and water. The problem in using this material is in catalyzing the polymerization. If a delayed action catalyst is carried in a mixture containing the furfuryl alcohol oligomer, polymerization may occur too early causing wellbore blockage or too extensively so that permeability is lost; or alternatively, polymerization may not occur at all or be inadequate to effect consolidation.

Various processes for formation consolidation are disclosed in U.S. Pat. Nos. 3,536,137; 3,759,327; 4,042,032; 4,427,069 and 4,669,543, the entire disclosures of which are incorporated herein by reference.

The technique described by the present invention represents an improvement over the methods used previously in that polymerization and consequently the subsequent consolidation of the particulate in the formation is positively controlled in a manner whereby permeability of the formation is preserved.

SUMMARY OF THE INVENTION

The present invention provides a technique whereby an incompetent subterranean formation penetrated by a wellbore may be completed for testing or production without the undesirable production of formation solids with hydrocarbons that flow into the wellbore. The technique is accomplished by positioning an acid curable resin in the wellbore in the vicinity of a perforation or perforations penetrating the wellbore into the formation. A gas generating charge positioned within the wellbore then is ignited such that high pressure gases are produced which rapidly drive the resin from the wellbore through the perforation or perforations into the formation while generated gases simultaneously acid catalyze the resin thereby consolidating the surrounding formation. The high pressure gas also functions to "breakdown" the individual perforations thereby substantially assuring that each perforation is opened to the subterranean formation and capable of production.

DESCRIPTION OF THE PREFERRED EMBODIMENT

In accordance with the present invention, methods of consolidating incompetent solids in a subterranean formation penetrated by a wellbore are provided. The consolidation may be effected contemporaneously with perforation of the wellbore or subsequently to effect "breakdown" of the perforation to ensure communication through the perforation into the subterranean formation. The term "breakdown" as used herein is intended to mean the application of a fluid under pressure to a perforation to clean the perforation of a portion of any debris that may be present and provide effective communication to a subterranean formation for the flow of fluids from the formation into the wellbore.

In one embodiment of the present invention, the consolidating fluid is positioned within casing in a wellbore, subsequent to perforation of the wellbore, in the vicinity of the perforations. The well may be drilled and the casing may be placed by any of the conventionally known methods of performing such operations. A gas generating charge then is positioned in the wellbore within or near the consolidating fluid. The order of placement of the charge and consolidating fluid may be reversed without any effect upon performance of the present invention. The vicinity of the perforations may be isolated from the remainder of the wellbore by packers or the like in the casing. The gas generating charge may be contained within any suitable housing. It is preferred that the housing be generally cylindrical in nature and have a diameter considerably less than the inside diameter of the casing in the wellbore to permit the presence of consolidating fluid alongside the housing within the wellbore. The fluid surrounding the housing will have more or less the form of an annulus, depending upon whether the housing is centered in the wellbore, or is located to one side of the center. The housing may be supported within the wellbore by a cable or by connections to a tubing string extending to the surface.

The gas generating charge in the housing comprises predominately a propellant which is relatively slow burning and nondetonating, propellants of this type are well known in the art so that it is unnecessary to discuss the numerous specific types available. The propellant may comprise, for example, a modified nitrocellulose or may comprise modified or unmodified nitroamine or a composite such as a composite containing ammonium perchlorate and a rubberized binder. Suitable propellants are disclosed in, for example, U.S. Pat. Nos. 4,590,997 and 4,739,832, the disclosures of which are incorporated by reference.

The charge may be ignited by any conventional ignition device such as an electrical igniter or a pressure actuated detonator or any other suitable device. As combustion of the charge in the housing progresses after ignition, the gas pressure generated in the housing is released by means such as pressure discs which unseat at a predetermined pressure from ports in the housing or any other suitable pressure release means into the consolidating fluid within the wellbore. As the gas enters the wellbore, the pressure continues to increase rapidly and ultimately forces at least a portion of the fluid within the casing in the wellbore through the perforation and into the unconsolidated formation. The expanding gas disperses and coats the consolidating fluid from the wellbore upon the incompetent particulate in the subterranean formation. The combustion gas also substantially simultaneously catalyzes the acid curable resin in the consolidating fluid upon contact therewith as a result of the acidic by-products, such as gaseous hydrogen chloride, that are produced during the combustion of the charge. The acidic by-product may result from the combustion process itself as when perchlorates are utilized or may be produced by the reaction of additional constituents admixed with such charge and which activate during the combustion process, such as would result from heat degradation of an acid ester to yield acidic by-products. The gas contacts the consolidating fluid with such force and in such an intimate manner that the resin is caused to rapidly harden as it contacts the particulate in the subterranean formation thereby consolidating the formation around the wellbore. The escaping gas while catalyzing the resin also functions to substantially maintain the formation permeability by passing through the pore spaces in the incompetent formation and maintaining the pore spaces in an open condition during catalyzation and hardening of the acid curable resin.

The consolidating fluid can comprise substantially any of the acid curable resins and may include hydrocarbon or aqueous carrier fluids. Examples of such acid curable resins are furan resins, phenol-formaldehyde resins and urea-formaldehyde resins. Of these, furan resins are particularly suitable. The term "furan resins" is used herein to mean condensation resin products derived from furfural or furfuryl alcohol such as furfural-phenol resins, furfuryl alcohol resins, furfural-acetone resins, furfuryl alcoholformaldehyde resins and the like. The most preferred acid curable furan resin for use in accordance with the present invention is a furfuryl alcohol resin.

The aqueous carrier may comprise aqueous salt solutions such as solutions of sodium, potassium or ammonium chloride, heavy brines containing calcium chloride or bromide, naturally occurring oil-field brines and sea water.

In preferred embodiments of the present invention, the consolidating fluid utilized is comprised of one of the acid curable resins described above combined with a diluent additive, such as for example, at least one member selected from the group consisting of furfuryl alcohol, butyl lactate, tetrahydrofurfuryl methacrylate, tetrahydrofurfuryl acrylate, esters of phthalic acid, furfural and dibasic esters of oxalic, maleic and succinic acids. The resin diluent can comprise substantially any of the well known diluent compounds. Such resin diluent additives impart a variety of desirable properties to the acid curable resin including lowering the viscosity of the resin, improving the dispersability of the resin in an aqueous carrier, reducing the solubility of the resin in an aqueous carrier, improving the coating of solids by the resin, improving the compressive strength of solids consolidated with the resin and allowing the resin to be utilized in low salinity carriers such as 2% by weight aqueous solutions of potassium chloride or ammonium chloride.

The consolidating fluid containing an acid curable resin can include a resin diluent additive of the type described above in amounts up to about 50% by volume of the consolidating fluid, preferably in an amount in the range of from about 0 to about 30% by volume.

The consolidating fluid also may include a coupling agent to promote strong resin-to-sand bonding such as an organosilicon compound. A preferred such compound is N-beta-(aminoethyl)-gamma-amino-propyl-trimethoxy silane.

Preferred resins or consolidating fluids for use in accordance with the present invention are, for example, the product SANDFIX A available from Halliburton Services, Durez 14407 available from Occidental Chemical Company and Fa-Rez B-260 and QuaCorr 1300 available from Quaker Chemical Company.

The consolidating fluid also may include other additives, such as, buffers, corrosion inhibitors and the like provided that the additive does not adversely react with the other constituents to prevent consolidation of the formation.

In another embodiment of the present invention, the consolidation is effected contemporaneously with perforation of the wellbore. In this embodiment, the wellbore is perforated utilizing wireline or tubing conveyed perforating charges. Methods of wireline and tubing conveyed perforating are well known and any conventional method may be utilized to effect the perforation of the wellbore to thereby effect communication through the casing in the well to the subterranean formation. In this instance, if tubing conveyed perforating is performed, one or more gas generating charges may be present and the charge housing or housings may be positioned at different points in the tubing string. If several perforating guns are utilized, for example, a charge housing could be positioned between each gun. The casing in the wellbore is filled with the consolidating fluid in the zone in which the perforating guns and gas generating charges are positioned. The gas generating charge may be ignited by the same detonation means employed to activate the perforating guns, by separate ignition means or by delayed ignition means initiated upon detonation of the perforating guns. In that the gas generating charge does not burn at the same rate as the explosives in the perforating guns it is possible to substantially simultaneously perforate the wellbore and breakdown the created perforations by forcing the consolidating fluid through the perforations substantially immediately after their creation. The rapid buildup of gas pressure in the vicinity of the gas generating charges forces the consolidating fluid into the incompetent formation from the casing. Upon hardening of the resin, various production tests may be performed by flowing formation fluids into the wellbore or other stimulation treatments may be performed without the risk of significant damage to the formation permeability in the vicinity of the wellbore as a result of the consolidation of the formation in the immediate area of the perforations.

In yet another embodiment of the present invention, after the combustion of the gas generating charge has caused at least a portion of the consolidating fluid to enter the formation and be catalyzed, a displacement fluid may be pumped into the wellbore to cause at least a portion of the consolidating fluid remaining in the wellbore to enter the formation. The displacement fluid can be substantially any fluid which does not immediately catalyze the acid curable resin, such as for example, the aqueous carrier fluid. The displacement fluid drives the consolidating fluid through the perforations and past the previously catalyzed resin into the unconsolidated formation. The acid curable resin in the consolidating fluid coats the particulate as it passes from the wellbore. Thereafter, a quantity of an aqueous acidic compound may be introduced as an overflush into the formation by pumping through the perforations in the wellbore to catalyze the remaining acid curable resin. Such additional displacement and catalyst overflush treatment extends the distance from the wellbore over which the subterranean formation is consolidated.

Although the invention has been described in terms of particular embodiments which are believed to represent the best modes of the invention at this time, it will be recognized by those skilled in the art that various changes may be made in the composition of the gas generating charge or consolidating fluid and the method of this specification without departing from the scope of the invention as defined in the following claims.

What is claimed is:

1. A method of consolidating incompetent particulate in a subterranean formation surrounding a perforated cased well penetrating the subterranean formation comprising:

introducing a consolidating fluid including an acid curable resin into said cased well which is capable of coating particulate in said formation and positioning said fluid in the vicinity of said perforations;

introducing a gas generating charge into said cased well and positioning said charge in the vicinity of said perforations;

igniting said gas generating charge whereby high pressure combustion product gases are produced and at least a portion of said consolidating fluid is caused to flow through the perforations and into the subterranean formation adjacent said perforations by said gas pressure;

coating at least a portion of said incompetent particulate in said formation with said consolidating fluid;

catalyzing said acid curable resin in said consolidating fluid introduced into said formation by said combustion product gases by contact with gaseous acidic products produced during combustion of said gas generating charge;

injecting a displacement fluid into said cased well to displace at least a portion of said consolidating fluid remaining in said well through the perforations and into the subterranean formation beyond the previously consolidated particulate in said formation to coat additional incompetent particulate; and introducing an aqueous acidic compound into said formation to catalyze at least a portion of said acid curable resin in said displaced consolidating fluid whereby said resin is caused to consolidate additional coated particulate in said formation thereby extending the distance from the wellbore over which the subterranean formation is consolidated.

2. The method of claim 1 wherein the acid curable resin comprises at least one member selected from the group of furan resins, phenol-formaldehyde resins and urea-formaldehyde resins.

3. The method of claim 1 wherein said consolidating fluid includes a resin diluent.

4. The method of claim 3 wherein said diluent comprises at least one member selected from the group of tetrahydrofurfuryl methacrylate, tetrahydrofurfuryl acrylate, esters of phthalic acid, furfuryl alcohol, butyl lactate, furfural and dibasic esters of oxalic, maleic and succinic acids.

5. The method of claim 1 wherein said consolidating fluid includes a coupling agent to promote resin to formation bonding upon catalyzation of the resin.

6. The method of claim 5 wherein said coupling agent comprises an organosilicon compound.

7. The method of claim 1 wherein said consolidating fluid includes an aqueous carrier fluid.

8. A method of consolidating incompetent particulate in a subterranean formation surrounding a cased well penetrating the formation comprising:

introducing a consolidating fluid including an acid curable resin into said cased wellbore proximate a predetermined zone ;

introducing a gas generating charge into said cased wellbore proximate said consolidating fluid;

perforating a predetermined zone in said wellbore;

igniting said gas generating charge whereby high pressure combustion product gases including acidic by-products are produced and a portion of said consolidating fluid in said wellbore is caused to flow through the perforated zone in said wellbore and into the subterranean formation;

coating at least a portion of said incompetent particulate in said formation with said consolidating fluid;

catalyzing said acid curable rein in said consolidating fluid within said formation by contact with said acidic by-products whereby said resin is caused to harden and consolidate at least a portion of the particulate coated by said consolidating fluid;

injecting a displacement fluid into said wellbore to displace at least a portion of said consolidating fluid remaining in said wellbore into said formation, at least a portion of said displaced consolidating fluid being displaced beyond the previously consolidated particulate in said formation to coat additional incompetent particulate; and introducing an aqueous acidic compound into said formation to catalyze at least a portion of said acid curable resin in said displaced consolidating fluid whereby additional particulate is caused to be consolidated in said formation thereby extending the distance from the wellbore over which the subterranean formation is consolidated.

9. The method of claim 8 wherein the acid curable resin comprises at least one member selected from the group of furan resins, phenol-formaldehyde resins and urea-formaldehyde resins.

10. The method of claim 8 wherein said consolidating fluid includes a resin diluent.

11. The method of claim 8 wherein said consolidating fluid includes a coupling agent to promote resin to formation bonding upon catalyzation of the resin.

* * * * *